(12) United States Patent
Piro

(10) Patent No.: US 11,006,712 B2
(45) Date of Patent: May 18, 2021

(54) MULTI-FUNCTION WALLET

(71) Applicant: Victor Glen Piro, San Clemente, CA (US)

(72) Inventor: Victor Glen Piro, San Clemente, CA (US)

( * ) Notice: Subject to any disclaimer, the term of this patent is extended or adjusted under 35 U.S.C. 154(b) by 171 days.

(21) Appl. No.: 15/990,248

(22) Filed: May 25, 2018

(65) Prior Publication Data
US 2018/0271239 A1 Sep. 27, 2018

Related U.S. Application Data

(63) Continuation of application No. 14/677,950, filed on Apr. 2, 2015, now Pat. No. 9,980,541.

(60) Provisional application No. 61/974,247, filed on Apr. 2, 2014.

(51) Int. Cl.
A45C 1/06 (2006.01)
H04B 1/3888 (2015.01)
A45C 11/00 (2006.01)
A45C 1/08 (2006.01)

(52) U.S. Cl.
CPC ............. *A45C 1/06* (2013.01); *H04B 1/3888* (2013.01); *A45C 2001/065* (2013.01); *A45C 2001/086* (2013.01); *A45C 2011/002* (2013.01); *A45C 2200/15* (2013.01)

(58) Field of Classification Search
CPC ................ A45C 1/06; A45C 2001/065; A45C 2001/086; A45C 2011/002; A45C 2200/15; H04B 1/3888
See application file for complete search history.

(56) References Cited

U.S. PATENT DOCUMENTS

| | | | | |
|---|---|---|---|---|
| 1,768,675 A * | 7/1930 | Egan | .......................... | G09F 1/14 248/473 |
| 2,256,513 A * | 9/1941 | Bauer | .................. | A47B 23/044 281/33 |
| 3,981,522 A * | 9/1976 | Bloom | .................. | B42D 3/126 281/34 |
| 3,994,460 A * | 11/1976 | Geiger | ...................... | G09F 1/14 248/176.1 |
| 6,227,504 B1 * | 5/2001 | Seaberg | .................. | A47F 7/142 248/174 |
| 6,435,236 B2 * | 8/2002 | Gribovsky | ............... | A45C 1/06 150/137 |
| 6,729,518 B2 * | 5/2004 | Badillo | .................... | A45C 9/00 224/240 |
| 6,772,879 B1 * | 8/2004 | Domotor | ................ | A45C 11/00 206/320 |
| 7,584,841 B2 * | 9/2009 | Chan | ...................... | A45C 11/00 206/305 |
| 7,861,995 B2 * | 1/2011 | Liou | .................... | F16M 11/105 248/454 |
| D669,480 S * | 10/2012 | Piedra | ......................... | D14/440 |

(Continued)

*Primary Examiner* — Tri M Mai

(74) *Attorney, Agent, or Firm* — Donn K. Harms

(57) ABSTRACT

A multi-function wallet is provided which is adapted in one mode for carrying and storage of non-flat items concurrently with and conventional flat items. Additionally, the wallet or an engaged stand component is configured to securely yet removably engage a computing device with a viewable screen such as a smartphone, and hold it at multiple angles while in an inclined position so as to be easily viewable by a user.

8 Claims, 10 Drawing Sheets

(56) References Cited

U.S. PATENT DOCUMENTS

| | | | | |
|---|---|---|---|---|
| 8,684,174 B2* | 4/2014 | Sirichai | ............... | A45F 5/02 |
| | | | | 206/320 |
| 8,746,638 B2* | 6/2014 | Carney | ............ | H04M 1/04 |
| | | | | 248/188.1 |
| 8,899,415 B2* | 12/2014 | McCosh | ............ | G06F 1/166 |
| | | | | 206/320 |
| D745,013 S* | 12/2015 | Brierley | ............ | D14/440 |
| 9,762,713 B2* | 9/2017 | Lambert | ............ | H04M 1/12 |
| 9,980,541 B2* | 5/2018 | Piro | ............ | A45C 1/06 |
| 2014/0262853 A1* | 9/2014 | DeChant | ............ | A45C 1/06 |
| | | | | 206/45.2 |

* cited by examiner

MULTI-FUNCTION WALLET

This Application is a Continuation of U.S. patent application Ser. No. 14/677,950 filed on Apr. 2, 2015 which claims priority to U.S. Provisional Patent Application Ser. No. 61/974,247 filed on Apr. 2, 2014, both of which are included herein in their respective entirety by this reference thereto.

BACKGROUND OF THE INVENTION

1. Field of the Invention

The present invention relates generally to billfolds, wallets and storage containers of the like. More particularly the invention relates to a multi-function wallet device providing a pocket-positioned container for carrying and storage of currency and conventional flat items. Additionally, the disclosed device is adapted for removable engagement to digital media devices such as a smartphone or pad, and function as a support for holding the media device and adjusting it to any of a plurality of viewing angles using a support, which also may be removably engaged to the wallet.

2. Prior Art

It is conventionally known that wallets are often limited on storage space, due to the fact that such wallets need to fit into pockets of limited size. The storage space provided by today's currently available wallet designs typically only allow for the storage of flat objects such as cash, cards, & coins, and conventionally do not easily store bulky, non-flat items, if at all. For example, if a user were to store a non-flat item such as a tube of lipbalm, a wireless earphone device, headphones, batteries, and the like inside a conventional wallet, it would not only add bulk and thickness to the wallet, but it would also become oddly shaped and uncomfortable in the users pocket. In addition, these items placed in a conventional wallet are also likely to get broken under pressure, while they're being sandwiched between other hard surfaced items stored in the wallet like credit cards, ID cards, and the like.

Current wallet designs provide users with some storage option typically by forming the wallet in one of two configurations being three-fold, or two-fold type configurations. Briefly, a three-fold wallet typically comprises three planar portions of material engaged side to side having foldable portions acting as hinges communicating between adjacent planar portions. Therefore, a three-fold wallet typically has two fold portions, or hinges. This allows the wallet to fold into a volume having a length and width the size of one of the three portions.

A two-fold, or 'bi-fold' wallet generally comprises two planar portions of material which fold together along a common centerline typically being a hinge. Therefore a two-fold wallet comprises a single hinge area.

In addition to wallets, many individuals also carry digital media devices such as cellphones, smartphones, pad computers and similar electronic devices having a video display. Such electronic accessories tend to further clutter the already limited space of a users pocket. As a result, some art has been driven to teach the provision of wallet devices which are additionally configured to hold and secure a smartphone, as well as conventional flat items such as credit cards, ID cards, and cash, in a single unit.

An example of such a device can be found in U.S. Pat. Pub. No. 2011/0089077 to Ziemba, and others. This and similar devices typically securely engage the smartphone into the wallet device in a permeant manner. In addition, a particular feature about such devices is that they often allow the wallet device to be used as a stand to prop smartphone in a position for viewing when desired.

However, aside from the few benefits, the intentional permanent engagement of the smartphone type devices to the wallet creates multiple problems. For example, the wallet is substantially lager & bulkier when inserted into a pocket because the smartphone is always included. Further, this increase in bulk results in less storage space and can be painful when sat upon for long periods. Additionally, when the user wishes to use the phone the entire wallet device must be removed from a pocket. Such constant removal can result in items in the wallet dislodging while using the phone. Still further, losing the wallet permanently engaged to the phone, will always result in loss of the users phone and vise versa.

Further, the prior art generally allows positioning the smartphone into a horizontal viewing position and such do not provide any structure for adjusting viewing angles. Still further, the prior art fails to provide a phone support which is disengageable from the wallet itself and which may also be employed as a smaller carrying device for cash and credit cards which may be employed to position the phone to various viewing angles.

As a result, there is a continuing unmet need for a multi-function wallet device which provides for carrying and storage of non-flat items and conventional flat items, and is adapted for securely, yet removably engaging digital media devices such as a smartphones using a permanently engaged support or a removable support functioning as a carrying case. Such a device should provide support for holding the digital media device in a manner that is adjustable to a plurality of viewing angles for the user. By allowing the digital media device to be removably engaged from the wallet device, either using a permanent removable engaging component, or a removable support attachable to the wallet, excessive wallet bulk is eliminated while still maintaining the full amount of storage provided by the device; the items stored in the wallet can be accessed while the phone is used; and if the smartphone is lost, the wallet is not.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a multi-function wallet device which utilizes a conventionally unused portion of a typical folding wallet configuration as a means for carrying and storage of non-flat items. In accordance with preferred modes, the device comprises a main body which is configured generally as either a three-fold, or two-fold type wallet, wherein the means for storage of non-flat objects is provided by at least one storage compartment located in an engagement with at least one of the hinges of the main body of the device.

The storage compartment can be permanently engaged or removably engaged from the main body of the wallet device. Preferred means for removable engagement is one or a plurality of zip fasteners, however other suitable means for removable engagement may be employed and are anticipated. For example, hook and loop fabric, magnets, or snap fit fasteners may be employed.

The various components of the device disclosed herein can be formed of conventional materials such as leather, vinyl, faux leather, cloth, or fabric however can be formed of any material suitable for the purposes set forth in this disclosure. It is additionally noted that the device being generally in the shape of a conventional wallet, may be constructed from conventional methods, without implying any limitations thereon, wherein sections of material are engaged via known techniques such as sewing, stitching, welding, adhesives, or any other suitable method of construction.

In all modes, the storage compartment becomes an unhindered usable storage space. By utilizing the full storage potential of this unique storage compartment, in both removable and permanently engaged modes of supporting a smartphone or pad device, the device in one mode allows the user to now safely store & carry larger non-flat objects, such as; earbud style headphones, wireless earphone devices, phone chargers, thumb drives, lip balm, etc. In addition, in at least one preferred mode, the storage compartment may be configured with built-in speakers for connection to a digital media device to enhance the sound of the digital media device. Further, the support for positioning the smartphone to multiple viewing angles may be provided as permanently engaged to the wallet, or as a separable support with storage for both cash and credit cards.

As an advantage over prior art, the provision of a storage compartment engaged to a hinge of the wallet body, allows the main body of the wallet to be employed for cash and card storage as is typically found in conventional wallets, while allowing the hinge to extend into a unique storage compartment, without adding substantial overall bulk to the wallet. Upon a further reading of this disclosure, one skilled in the art will immediately recognize these and similar advantages of the present invention over conventional wallets and those found in prior art.

Firstly, since the storage compartment is located at the end of the wallet at one of the hinges, rather than inside the main body of the wallet, when items are placed inside the compartment they are typically not sandwiched between hard surfaced items in the wallet and thus are less likely to be broken. In addition, the location of the storage compartment allows the wallet to maintain a thin profile because there are no additional items surrounding it, adding unnecessary bulk as outlined earlier. Further, items can be removed or put into the compartment quickly and easily via an exterior zipper access or other means for accessing the storage compartment while the main body of the wallet is in the closed position. This provides added security for the user since the chance of other items dislodging or falling from the wallet is substantially reduced.

Still further, in modes of the device employing a removably engageable storage compartment, the user is provided with the choice to either expand the storage capacity of the wallet or to minimize it for a sleeker smaller look and fit by removing it. For example, the user may choose to leave the wallet behind at times to say, carry the compartment with headphones inside, into the gym, while leaving their wallet in the car.

In accordance with a first particularly preferred mode of the multi-function wallet device, the main body of the device is configured as a two-fold type wallet configuration, and having a third folding body employed to store various components of the device including a wallet support member and car headrest engagement means to be described in more detail below. A removable storage compartment, as described previously, is additionally employed and is removably engaged to at least one hinge as outlined above.

Means for securely yet removably engaging a digital media device is provided by one or a plurality of support wings. Elastic support straps engaged to the support wings are preferably employed for securing the digital media device to the support wings. With the digital media device securely engaged to the support wings, the wallet body is then configurable into one of a plurality of stand modes (described in more detail later) thereby providing the means for holding the digital media device at a plurality of viewing angles. In at least one stand mode, the device can be supported on a table or other surface in vertical or horizontally disposed positions, to prop the digital media device into a desirable viewing angle.

Further, additional means for holding the digital media device at a plurality of angles are provided by car seat headrest & sun visor engagement means which allows the wallet device to be hung from a plurality of different locations for optimal viewing of the digital media device engaged thereon. For example, the car seat headrest engagement means allows the device to be supported from the rear of a conventional headrest of a passenger vehicle, for viewing by a rear seated passenger.

A support strap is preferably provided as a sun visor engagement means, which may allow the device to be engaged to many items, such as a visor in the interior of a vehicle for use with a GPS digital media device, however additionally provides a means for hanging the device from any desired location, such as a door handle for viewing of the digital media device. Therefore the engagement of the strap to the desired location will additionally provide a means for holding the digital media device as needed.

Further, means for carrying and storage of conventional flat items are provided by one or a plurality of cash compartments of the main body and one or a plurality of card holding compartments employed for storing conventional flat items such as cash, receipts, credit cards, ID cards, debit cards, etc. In addition, anti-slip retainer means may be employed in combination with the card holding compartments which provides a means for enhancing the frictional engagement of flat items within the card holding compartments. This will provide added security of such items held within the device, and are an especially preferred feature.

The device in the current mode provides all the features typically found in a conventional wallet such as; cash & card storage, with the added utility to transform the wallet device into a sturdy digital media device stand which works both in the horizontal & vertical positions. In the horizontally positioned stand mode, the wallet device is configured with retainer straps employing hook and loop fasteners for securing the device into the stand configuration. The retainer straps can be selectively adjusted to vary shape of the device and therefore the disposition of the operatively engaged digital media device as a means for adjusting the viewing angle to give the user greater flexibility while viewing the digital media device at varying angles. In addition, as noted previously, the storage compartment may be employed to protect and contain accessories, including headphones or other small electronics, keeping them neatly wound for easy removal when desired.

In yet another particularly preferred mode of the device, the main body is of a three-fold type configuration. This mode may be configured with one or any suitable combinations of the features of the previously described mode of the invention, as deemed suitable by the designer to provide means for carrying and storage of non-flat items and conventional flat items, means for securely yet removably engaging digital media devices, means for holding the digital media device at a plurality of viewing angles, and means for adjusting the viewing angle. A more complete description of this mode will be provided later.

Before explaining any further preferred modes of the invention, it is to be understood that the aspects and features described in any of the preferred modes may be used singularly or in any combination as deemed suitable by the designer. Therefore those skilled in the art will recognize the plurality of different combinations and configurations of the described features which can be carried out in the construction of the device.

With that being said, in additional particularly preferred modes of the present invention, the main body of the device is configured as a two-fold, or 'bi-fold' type wallet. These modes also preferably include means for carrying and storage of non-flat items and conventional flat items, means for securely yet removably engaging digital media devices, means for holding the digital media device at a plurality of viewing angles, and means for adjusting the viewing angle. Storage of non-flat items are preferably provided by a permanently engaged storage compartment disposed on the single hinge of the two-fold main body. Permanent engagement means may include stitching, sewing, or other suitable means. The storage compartment may have compartment access means from any one or both of the exterior and interior portions of the wallet device, which allows the user to easily retrieve items from the storage compartment as needed. Compartment access means may include openable zip fasteners, hook and loop fasteners, snap fits fasteners, or other suitable means. A more complete description of this mode will be provided in the detailed descriptions of the preferred modes of the invention shortly below.

It is briefly noted that upon a reading this disclosure, those skilled in the art will recognize various means for carrying out these intended features of the invention. As such it is to be understood that other devices which are slightly or moderately modified from the preferred modes may be configured to carry out these features and are therefore considered to be within the scope and intent of the present invention, and are anticipated.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 1 shows a view of a first preferred mode of the device, having a two-fold type main body with a third folding body engaged thereto, and including compartments for carrying and storage of non-flat items and conventional flat items, means for securely yet removably engaging digital media devices, and components enabling support for the digital media device at a plurality of viewing angles, and means for adjusting the viewing angle.

Figure 18:
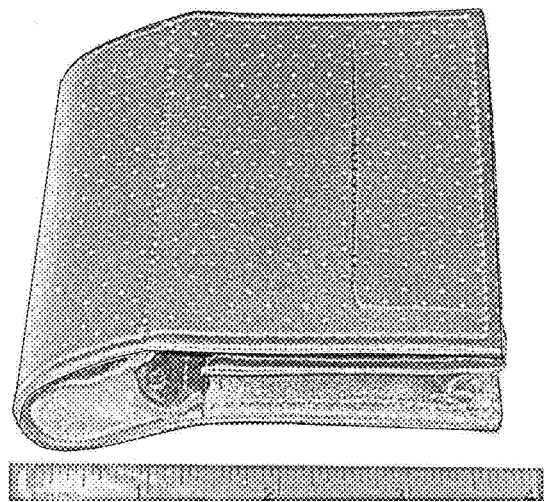

FIG. 18 The lower planer compartment has been shortened by approximately ½ inch.

Figure 19:
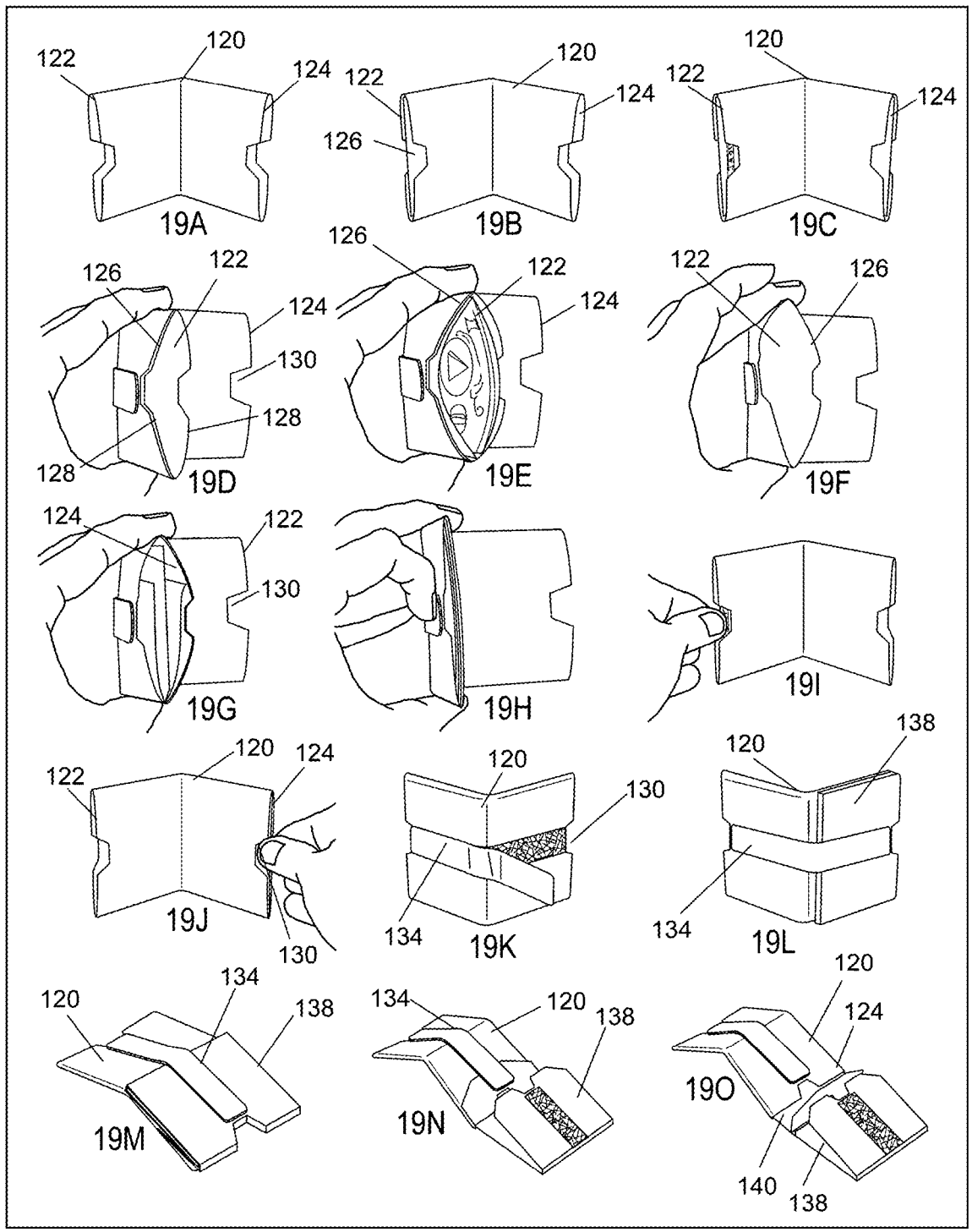

FIG. 19 depicts a series of views of another preferred mode of the device having a multiple compartment wallet and engageable support for a smartphone or the like for angled positioning.

Figure 20:
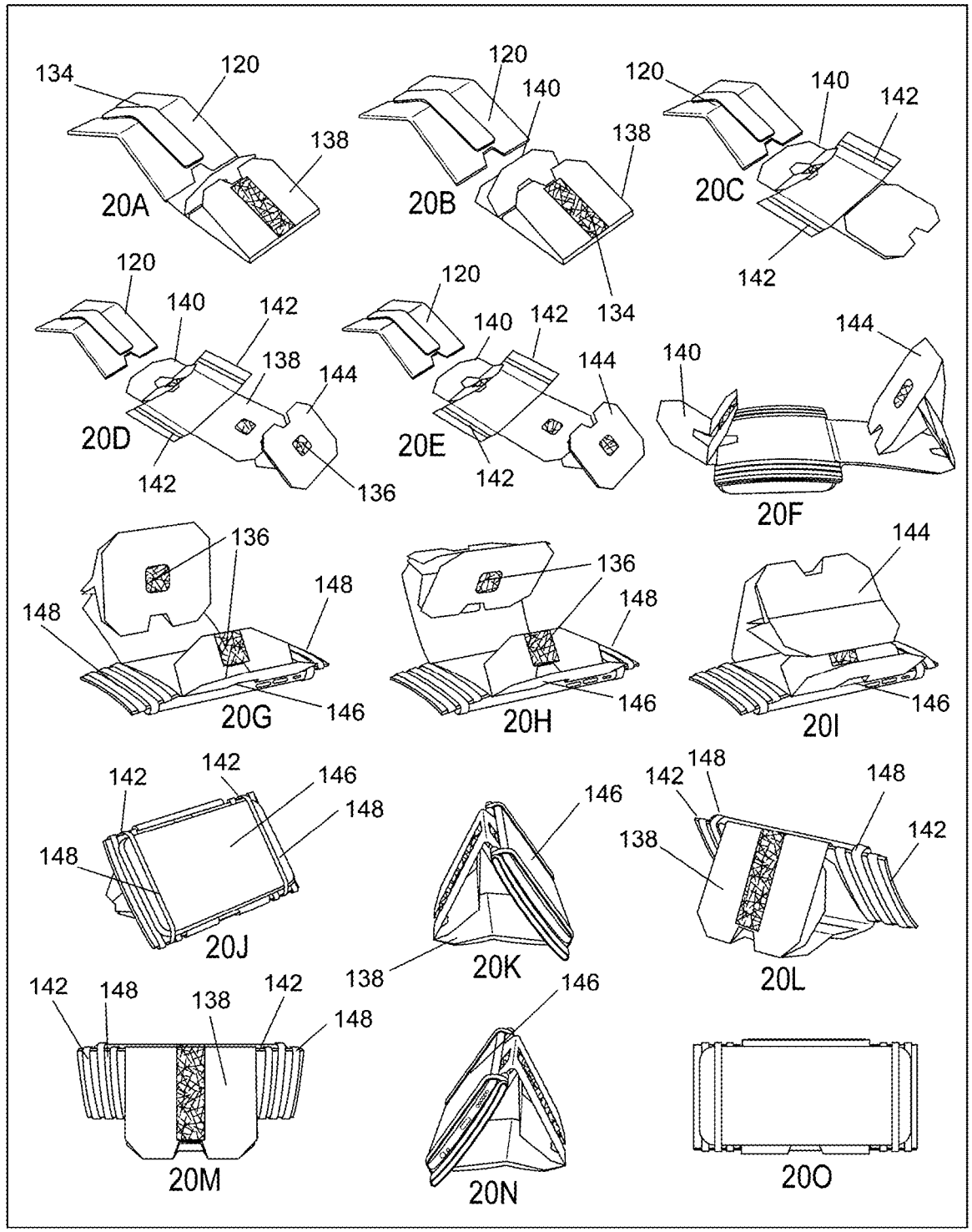

FIG. 20 shows a second series of views of the device of FIG. 19 where the stand is removable from the wallet body and configurable to hold the smartphone or computing device in an inclined position to a mid portion of the body of the stand.

Figure 21:
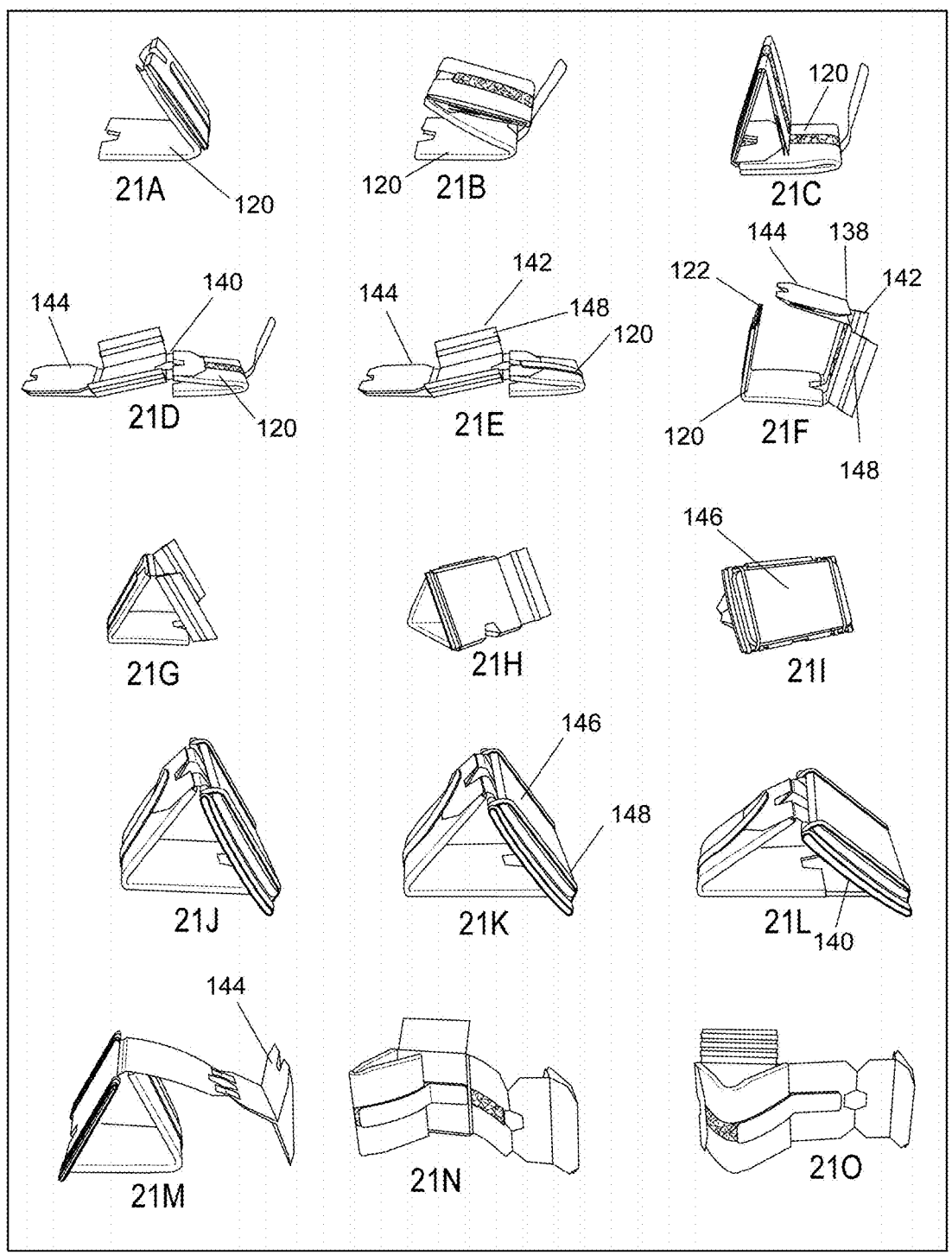

FIG. 21 depicts the device of FIGS. 19 and 20 wherein the wallet is engaged to the stand while forming the support for the smartphone or planar computing device to an inclined angled position.

Figure 22:
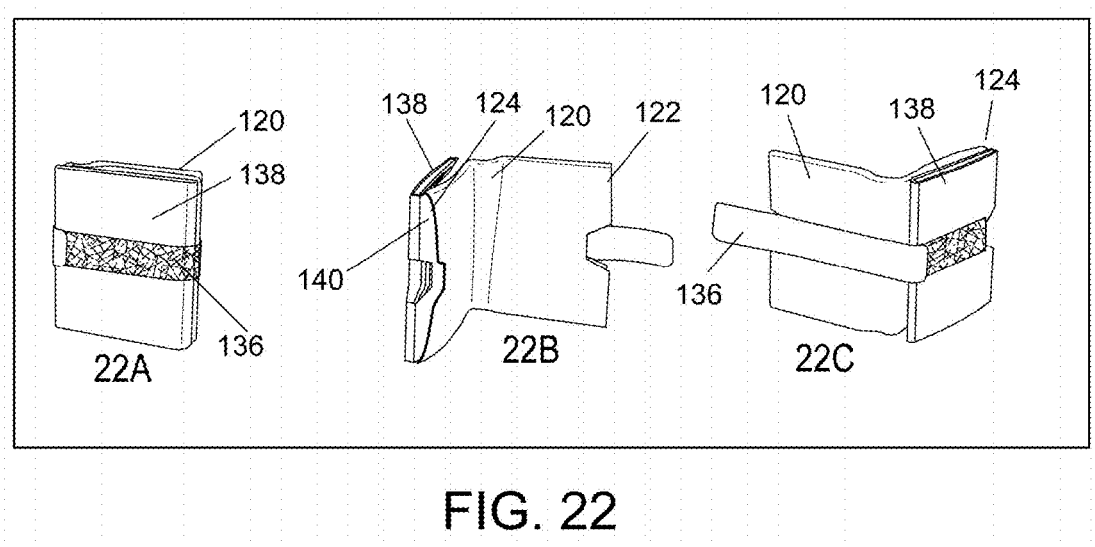

FIG. 22 shows a series of views of the device of FIGS. 20 and 19 where it is configured between a closed position for pocket engagement and an open position.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-22, wherein similar components are identified by like reference numerals, there is seen in FIGS. 1-5, views of one particularly preferred mode of the device 10 comprising a main body 12 which is configured as a two-fold type wallet device 10. The body 12 generally includes first 14 and second 16 planar portions of material which fold together along a common centerline defined by a formed hinge 18 type engagement formed of material or fabric similar to the body 12.

Also shown a second carrier or third folding body 20 is provided and communicates with the second planar portion 16 via a common centerline also defined by a hinge 22. It is noted that the hinge 22 may include means for removable engagement thereby allowing the third folding body 20 to be removed from the main body 12 if desired by the user. Further, it should be noted that the device 10 may be configured to allow the third folding body 20 to be removed with or without the compartment 36 as deemed suitable by the designer. Means for removable engagement can include zip fasteners, hook and loop fasteners, magnet fasteners, snaps, or any other suitable fasteners as would occur to those in the art.

It is noted that in all preferred modes, the device 10 comprises one or any suitable combination of means for carrying and storage of non-flat items and conventional flat items, means for securely yet removably engaging digital media devices such as a smartphone, means for holding the digital media device at a plurality of viewing angles, and means for adjusting the viewing angle. The various components of the device 10 employed for carrying out these features are described in more detail below. It is noted that those skilled in the art may recognize various other means for similarly carrying out these features which may differ in construction from the preferred modes, however without departing from the scope and intent of the present invention these modification are anticipated.

In a current mode, the means for storage of non-flat objects is provided by at least one non-flat item storage compartment 36 located in an engagement with at least one of the hinges engaged to the main body 12 of the device 10. Currently, the storage compartment 36 is shown to be removably engageable to the hinge 22 communicating between the second planar body 16, and third folding body 20. The storage compartment 36 is preferably removably engageable from the main body 12 of the wallet device 10 wherein preferred means for removable engagement is one or a plurality of zip fasteners 40. However, other suitable means for removable engagement may be employed and are anticipated. For example, hook and loop fabric, magnet fasteners, or snap fit fasteners may be employed.

The various components of the device 10 disclosed herein can be formed of conventional materials such as leather, vinyl, faux leather, cloth, or fabric however can be formed of any material suitable for the purposes set forth in this disclosure. It is additionally noted that the device 10 being generally in the shape of a conventional wallet, may be constructed from conventional methods, without implying any limitations thereon, wherein sections of material are engaged via known techniques such as sewing, stitching, welding, adhesives, staples, rivets, or any other suitable method of construction. Further, it is anticipated that the device 10 may employ portions of RFID blocking material to protect the magnet strips employed on conventional credit and ID cards.

It is the intent of removable storage compartment 36 to provide the user with greater flexibility of use of the wallet device 10 by allowing them to either attach or remove the compartment 36 to the hinge 22 of the wallet 10. Thus the user can choose to have increased storage capacity with the compartment 36 or remove it if so desired to streamline the overall volume of the wallet 10. The storage compartment 36 in all modes, provides a location to store non-flat items which will be well protected and neatly contained, so they won't easily get lost falling out of their pocket when removing the device 10, unlike other conventional and prior art wallets. Items can be placed in the compartment 36 by unzipping the front zipper 38. However, in other modes not particularly shown, the location of this compartment 36 may include, but are not limited to; a reverse layout of the current depictions with the compartment 36 on the right side; and the inside hinge 18 between the first 14 and second 16 planar portions, and others deemed suitable by the designer.

Again, other means for removable engagement of the compartment 36 may include, but are not limited to; hook and loop fabric, tongue & groove, buttons, magnets, and fasteners of the like. In addition, the interior space (not shown) within the compartment 36 may be divided into different compartments internally by placing dividers inside to separate the sections. One or a plurality of zippers, snaps, or other fasteners on the outside could access these independent compartments if desired.

Means for securely yet removably engaging a digital media device 1000 is currently provided by one or a plurality of support wings 48. The support wings 48 are preferably engaged to the main body 12 of the wallet device 10, however in other modes may be engaged to the second carrier provided by the third folding body 20 if deemed suitable by the designer, and provide a means for securely yet removably engaging digital media devices 1000 such as smartphones, media players, music players, GPS devices, and the like. It is noted that in any of the preferred modes of the invention herein, the support wings 48 may be removably engageable via hook and loop fasteners, magnets, clips, or other suitable removable fasteners for the task.

Figure 4:
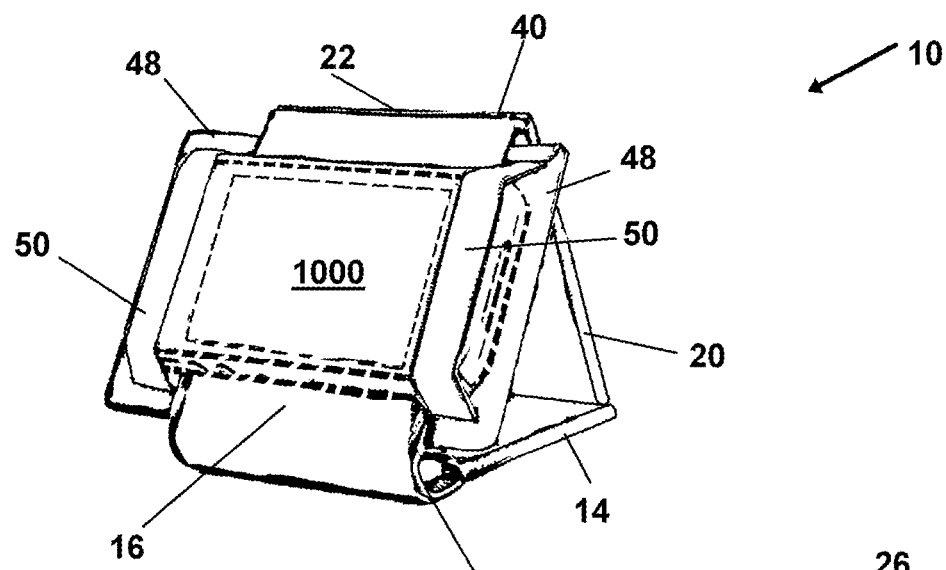
FIG. 4 depicts the device of FIG. 1 in a particularly preferred stand mode, providing a component for holding a digital media device at a plurality of viewing angles.

Elastic support straps 50 engaged to the support wings 48 are preferably employed for securing the digital media device 1000 to the support wings 48 as shown in one of the preferred as used stand modes in FIG. 4. In at least one preferred mode, the elastic support straps 50 may be removably engageable to the support wings 48 thereby allowing the user to replace the straps should the elastic become worn.

With the digital media device 1000 securely engaged to the support wings 48, the wallet body 12 can be configured into one of a plurality of stand modes (FIG. 4 and FIG. 5) which can be supported on a table or other surface in vertical or horizontally (FIG. 4) disposed positions, to prop the digital media device 1000 into a desirable viewing angle as is clearly shown in the FIG. 4, thereby providing the means for holding the digital media device at a plurality of viewing angles. It is noted that a vertical disposition of the digital media device 1000 can be easily accomplished simply by rotating the device 10 90 degrees in either direction.

Further, in FIG. 4, those skilled in the art will immediately recognize that the means for varying the viewing angle is provided by adjusting the triangular formation, as shown. This is preferably accomplished by selectively adjusting the positioning of the retainer strap 34 in an engagement with the loop fabric portion 30. For example, by engaging the retainer strap 34 to the loop fabric 30, closer to the hinge 22, the triangular configuration will be wider, therefore providing a flatter viewing angle of the operatively engaged digital media device 1000. Alternatively, by engaging the retainer strap 34 on the loop portion 30 adjacent the distal end of the first portion 14, the triangular form will be tighter, thereby providing a more vertical viewing angle of the digital media device 1000.

Figure 1:
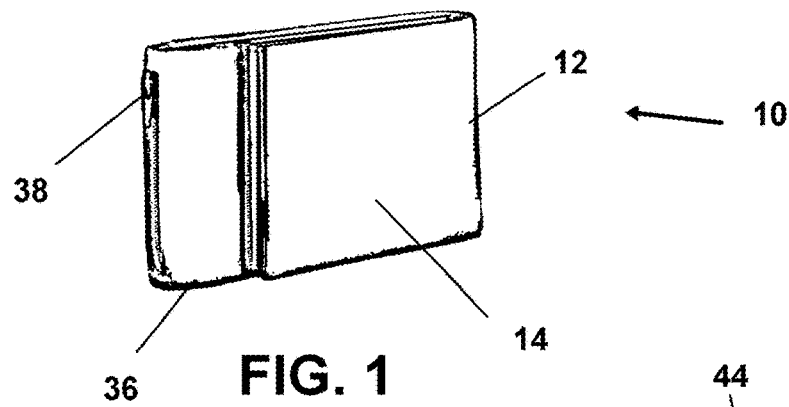
Figure 2:
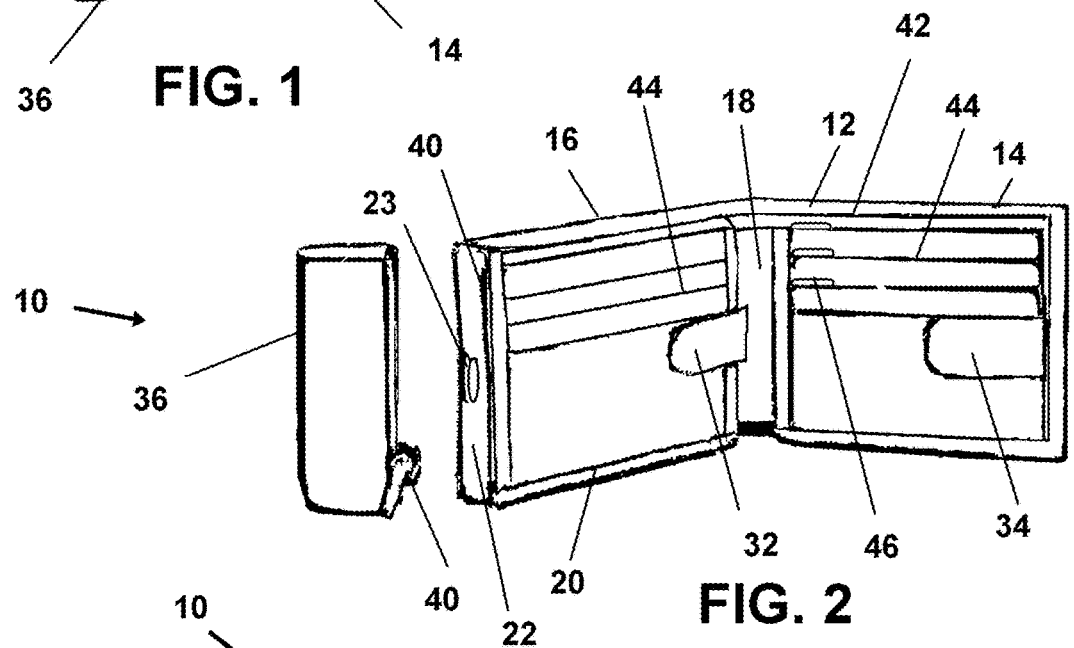
FIG. 2 shows the main body of the device of FIG. 1 in an open position, with the third folding body in the closed position, and depicting the removably engageable storage compartment.
Figure 3:
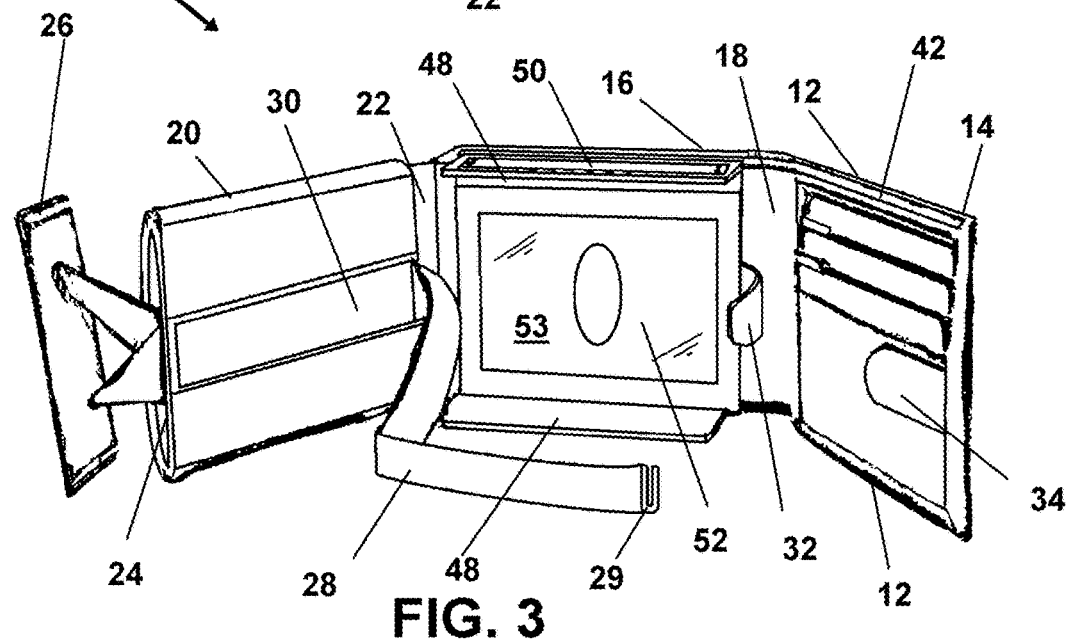
FIG. 3 shows the main body of the device of FIG. 1 in an open position, and showing a third folding body also in an open position.

A particularly preferred feature of the device 10 is to have the support wings 48 stealthily hidden under the third folding body 20, however can be quickly and easily opened up by simply tearing free a retainer strap 32 to allow the third body to rotate to an open position (FIG. 3). The retainer strap 32 may employ hoop fabric while loop fabric may be engaged at the complimentary portion of the third body 20 for securing it thereto. Alternatively, magnets, snap fits, or other suitable fasteners may also be employed, and are anticipated.

When the support wings 48 are retracted and opened up and the wallet device 10 is secured in the triangular or wedge shape formation as shown in FIG. 4 to provide a means for holding the digital media device at a plurality of viewing angles, these preferably ridged support wings 48 employing elastic support straps 50, hold the digital media device 1000 firmly in place. It is noted that other means for securing the digital media device 1000 to the wallet device 10 may be employed and are anticipated. For example, other means may include, but are not limited to: employing hook and loop fabric on the support wings 48 and or wallet surface and back of the digital media device 1000; the employment of magnets, tongue and groove fasteners, hook & loop fasteners.

Further, in regards to the currently shown mode, more than one row of elastic straps 50 may be employed to accommodate even larger size digital media storage devices 1000. Still further, in yet other modes however not particularly shown, the wallet device 10 could be configured with speakers built into each support wing 48 on the outside of the strap 50. These speakers would have a wired or wireless communication means connecting them that would communicate with a digital media device 1000 to enhance the sound of the device 1000. For example, near field communication (NFC), Bluetooth, wifi, or other suitable wireless communications means may be employed to communicate audio signals to the speakers.

However, it is noted that the location of the speakers may vary as determined by the designer, for example, the one or both of the speakers and/or power source (rechargeable or removable battery) could be in an engagement with the storage compartment 36.

Further, a car seat headrest & sun visor engagement means are additionally provided which allows the wallet device 10 to be hung from a plurality of different locations for optimal viewing of the digital media device 1000 engaged thereon. For example, shown in FIG. 5, the car seat headrest engagement means depicted as clip 26 allows the device 10 to be supported from the rear of a conventional headrest by strap member 27 passenger vehicle, for viewing by a rear seated passenger. In use the clip 26 is slide between a headrest and seat and then turned to a vertical disposition wherein it contacts the seat and headrest. The strap member 27 hands toward the bottom of the seat back, and supports the device 10 and any smartphone or similar component engaged.

A support member 28 is preferably provided which can be selectively engaged to an additional retainer strap 34, each respectively employing hook and loop fasteners or other suitable adjustable fasteners, and the provision of a loop fabric portion 30, or other suitable fastener, in the interior side surface of the third folding body 20, for forming the triangulated or wedge shape as needed for optimal viewing of the digital media device 1000.

It is noted that those skilled in the art will immediately recognize that the means for varying the viewing angle of the digital media device 1000 in the current mode is provided by varying the wedge or triangular shape of the device 10. Currently, the triangular shape is provided by an engagement of the support member 28 to the retainer strap 34. Therefore, by adjusting the position of the support member 28, and widening or tightening the angles forming the triangular shape shown, the user is provided with a means for adjusting the viewing angle of the digital media 1000 on the device 10. For example, with the retainer strap 34 engaged to the support member 28 at or near the distal buckle end 29, the triangular shape is lengthened, and the digital media device 1000 is positioned at a more vertical viewing angle. Alternatively, by engaging the retainer strap 34 to the strap 28 closer to the hinge 22, the triangular shape is tightened, and a flatter viewing angle is provided.

Engagement to a sun visor can be accomplished by communicating the support member 28 through the aperture 23 of the hinge 22, and placing the device 10 on the inside of a sun visor and wrapping the strap 28 around it to an engagement with the retainer strap 34.

In addition the strap 28 may also be employed to allow the device 10 to be hung from any desired location, for example a visor, door handle, or the like, for viewing of the digital media device 1000 as needed. For example, the distal end of the strap 28 can be looped around a door handle or other location, and the buckle 29 can be employed to secure the strap 28 back on itself.

Currently, one or a plurality of additional compartments 24 can be provided in the third folding body 20 which provides a storage means for the car headrest engagement means 26 and support member 28. As can be seen, an aperture 23 formed in the hinge 22 can be employed for communicating the strap 28 to the exterior of the device 10 for hanging the device 10 via the strap 28 from any location deemed suitable by the user.

Means for carrying and storage of conventional flat items are provided by a cash compartment 42 extending the length of the main body 12 as shown, and one or a plurality of card holding compartments 44 (in the form of slots) employed for storing conventional flat items such as cash, credit cards, ID cards, debit cards, etc.

Anti-slip retainer means 46 are preferably employed within or in combination with the card holding compartments 44. The addition of frictionally enhancing material to the inside of card holding compartments 44 or other locations where flat objects such as cards come in direct contact with the device, helps maintain the cards in registered engagement and properly positioned therein. Such frictionally enhancing material, say for example rubber or PVC, could either be placed inside the storage bays or card holding compartments or at other locations where the cards come in direct contact with the wallet device herein. Such anti-slip material could also be directional if needed, so as to provide a means to allow cards to slide in easily when storing them, but rendering them harder to pull out or dislodge.

The anti-slip retainer means 46 in the current mode are provided by engaging an elongated portion of high friction material such as rubber, or neoprene, or other fabric or material, at or near the opening of the compartments 44 which provides a means for enhancing the frictional engagement of flat items when they are slid into the card holding compartments 44. This will provide added security of such items held within the device 10, and are an especially preferred feature.

An ID compartment 52 is also preferably provided. This compartment 52 comprises a transparent viewing window 53 providing a means to display an operatively inserted ID card without the need to remove it. This is generally considered a conventional feature in many prior art wallets commercially available today. It is noted that in other modes the ID compartment 52 may be engaged to any one or suitable combination of the first 14 and second 16 planar members, or the third folding body 20 as deemed suitable by the designer.

Figure 6:
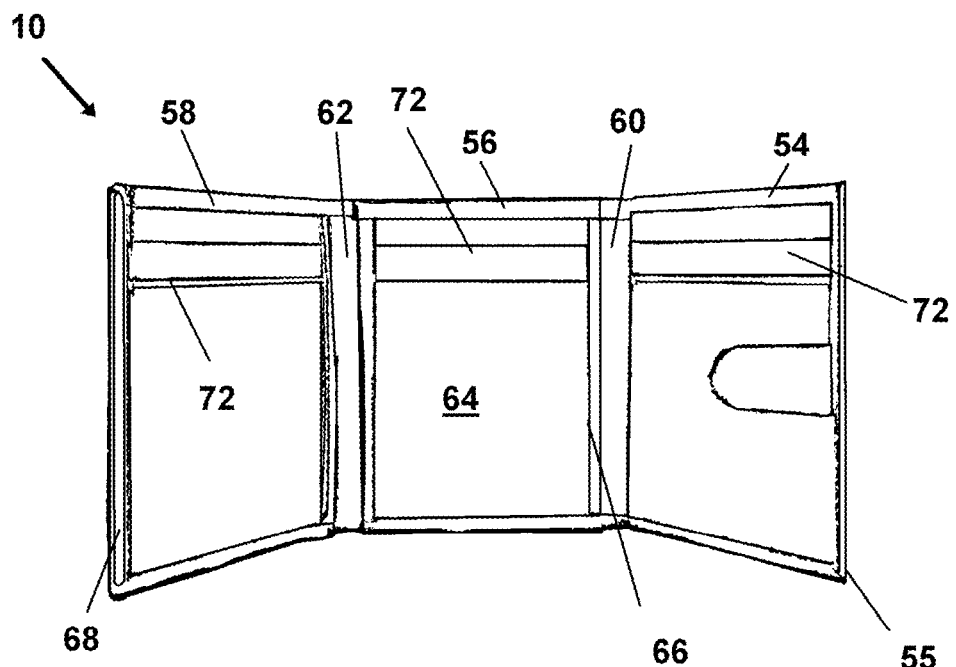
FIG. 6 shows a view of another particularly preferred mode of the device, having a three-fold type main body and compartments for carrying and storage of non-flat items and conventional flat items, and securement for removably engaging digital media devices which may be adjusted to a plurality of viewing angles.
Figure 7:
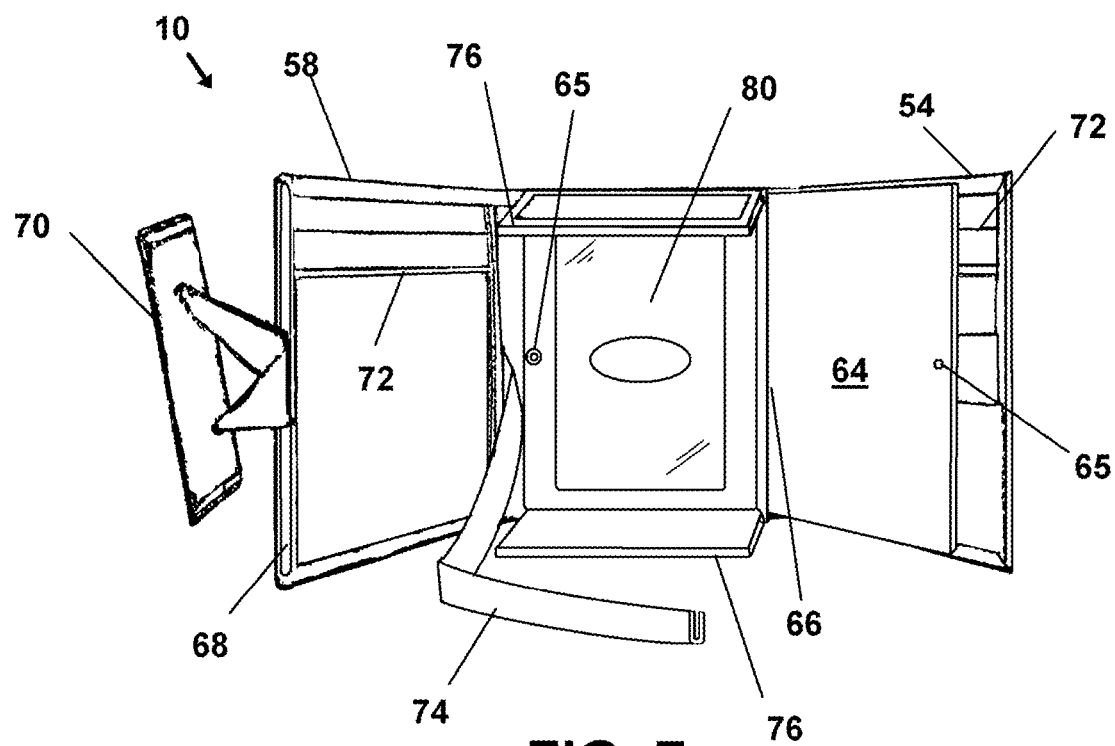
FIG. 7 shows the device of FIG. 6 with the various components such as the hanging or headrest attachment deployed for use.

FIG. 6 and FIG. 7 show yet another particularly preferred mode of the device 10 also configured with one or any suitable combinations of means for carrying and storage of non-flat items and conventional flat items, means for securely yet removably engaging digital media devices, means for holding the digital media device at a plurality of viewing angles, and means for adjusting the viewing angle. The main body 55 of the current mode is of a three-fold type configuration, comprising a first planar portion 54, a second planer portion 56, and a third planar portion 58. A first hinge 60 communicates between the first and second portions 54, 56 while a second hinge 62 communicates between the second and third portions 56, 58, respectively.

Figure 5:
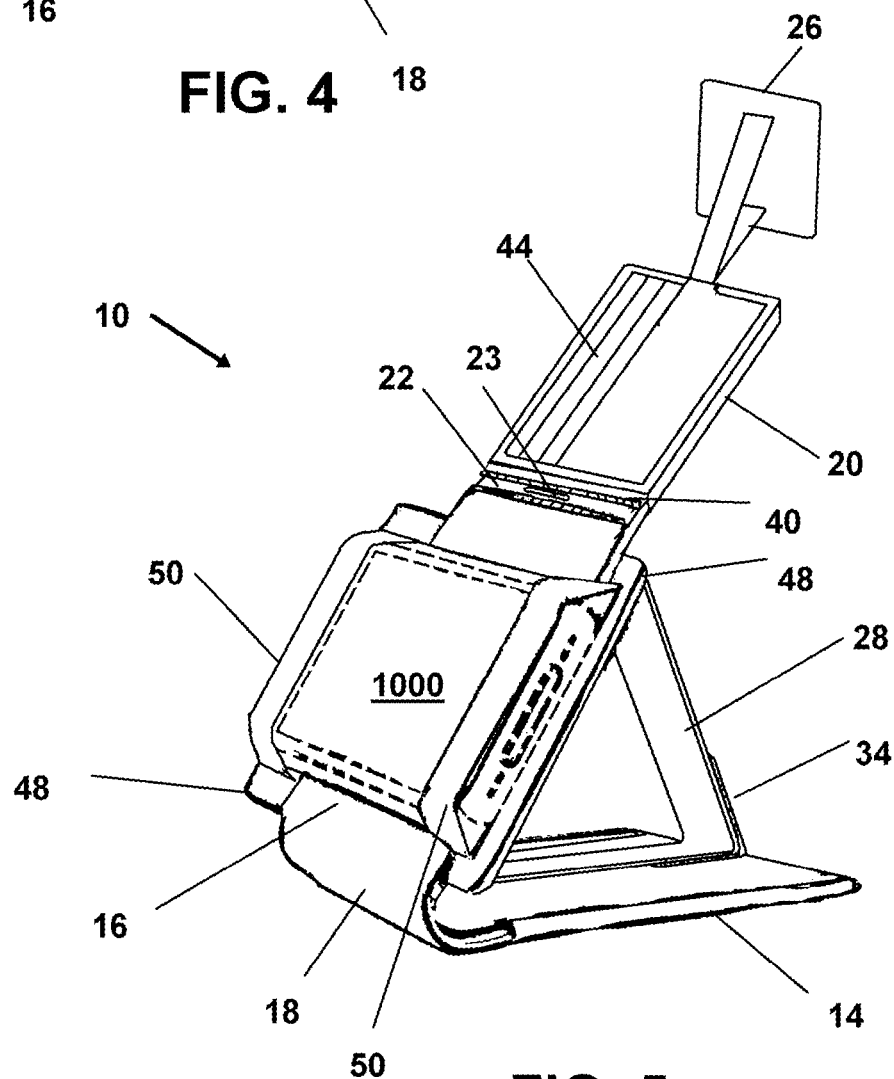
FIG. 5 shows the device of FIG. 1 in a depiction showing the car headrest engagement component of FIG. 3 and FIG. 5 in a deployed position.

It is noted that the current mode shown shares many of the same features of the mode of the device 10 of FIGS. 1-5, and is capable of forming the wedge shapes as shown in FIG. 4 and FIG. 5, however with some differences. In the current mode the cash compartment (not shown) will extend the entire length of the main body 55 as is conventional with three-fold type configurations. A plurality of card holder compartments 72 are also provided. The third planar portion 58 includes a compartment 68 employed for containing a car headrest engagement means 70 and support member 74 for purposes described in the previous modes.

In this mode, a foldable card holder flap 64 engaged to the second planar portion 56 on one side edge 66 at or near the adjacent hinge 60 is provided. The flap 64 includes a plurality of card holder compartments 72 as shown for holding cards as previously described. In addition, the flap 64 can be rotated open from right to left, serving as a means for securing and stealthily hiding the support wings 76 located beneath, as shown in FIG. 7.

A transparent ID compartment 80 may also be provided underneath the flap 64 as shown. It is noted that the flap 64 may alternatively be mounted on the opposite side or any other location deemed suitable by the designer and should not be considered limiting by the depiction. Snap fit type fasteners 65, or other suitable fasteners are preferably employed for securing the flap 64 in the closed position as shown in FIG. 6.

Figure 8:
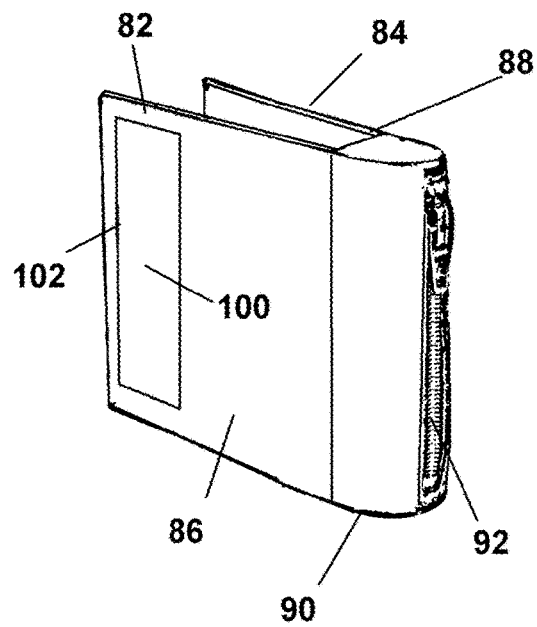
FIG. 8 shows a view of a first particularly preferred mode of the device, having a two-fold type main body and including compartments for carrying and storage of non-flat items and conventional flat items and components for engaging digital media devices which allows for adjustment to a plurality of viewing angles.
Figure 9:
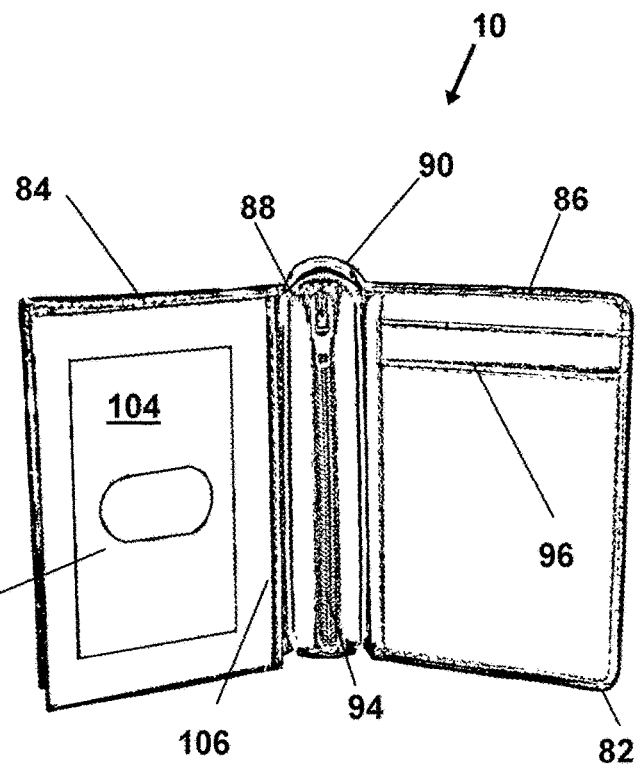
FIG. 9 shows the device of FIG. 8 in an open position revealing the interior of the device.
Figure 10:
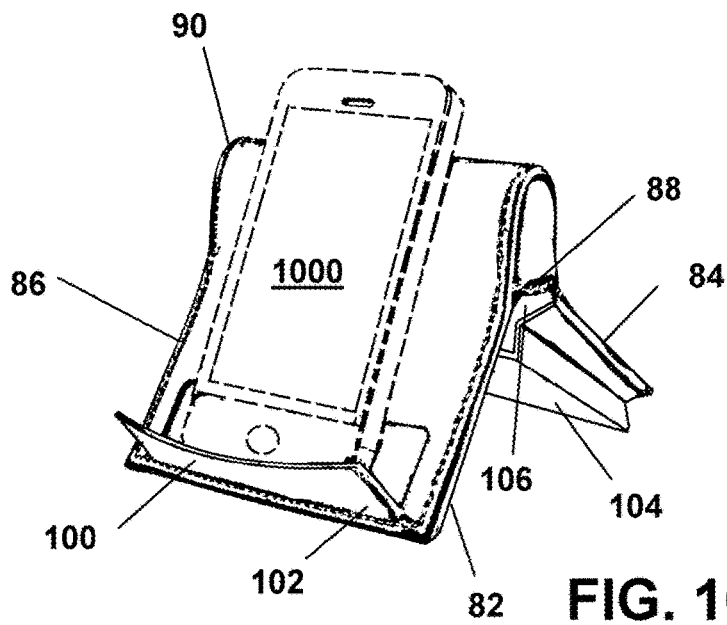
FIG. 10 depicts the device of FIG. 8 configured to a support or stand mode, providing means for holding a digital media device at a plurality of viewing angles.

FIG. 8, FIG. 9, and FIG. 10 show views of yet another particularly preferred of the present invention. In this mode, the main body 82 of the device 10 is configured as a two-fold, or 'bi-fold' type wallet comprising a first planar portion 84 and a second planer portion 86 separated by a central hinge 88. Means for carrying and storage of non-flat items is currently provided by a storage compartment 90 communicating with and extending from the central hinge 88. The central hinge 88 and the ergonomic & asymmetric design of the device shown in FIGS. 8-12, provide great utility in that an increase in both comfort and usability is afforded the device thereby enhancing utility.

The storage compartment is preferably permanently engaged, however removable engagement means as outlined in previous modes may be employed, and are anticipated. Permanent engagement means may include stitching, sewing, or other suitable means. The storage compartment 90 may have one or any suitable combination of an exterior 92 as well as interior 94 compartment access means which allows the user to easily retrieve items from the storage compartment 90 as needed. Compartment access means 92, 94 may include openable zip fasteners, hook and loop fasteners, snap fits fasteners, or other suitable means.

Means for carrying and storage of conventional flat items is provided by one or a plurality of card holder compartments 96, again in the form of slots. Further, an ID compartment 98 having a transparent viewing window is also included for purposes described previously. In addition, an interior sidewall 104 of the first planar portion 84 may be extendable in an accordion type fashion to reveal an interior hidden pocket 106 (shown more clearly in FIG. 10). Additionally, a flap (not shown) may be included to cover the pocket 106 and it may also have a fastener to hold items securely in place. Such fasteners could include for example snaps, hook & loop fabric, magnets, or other suitable fasteners to secure the flap shut. Such of course will be in addition to being able to use it flap free if so desired by the designer.

Means for securely, yet removably, engaging a digital media device 1000 is provided by a flap 100 disposed on the exterior surface of the second planar portion 86 (or first planar portion 84 if deemed suitable by the designer). However, the flap 100 is preferably secured to the exterior of the second planar portion 86 at one edge 102 such that the flap 100 can be rotated to create a platform for digital media device support as shown in FIG. 10. It is noted however that the flap 100 may be engaged at more then one edge 102 as needed for added support, and may possibly include an elastic support member for addition support of the flap 100 when folded out for use as a platform. Further, the provision of snaps, hook and loop fabric, or other suitable fasteners may be employed to secured the flap 100 closed when not in use.

It is also anticipated that the flap 100 may be formed to lie flush with the exterior of the second portion 86, however still engaged at only one edge 102, or possibly multiple edges or incorporating a support member if needed for added support. The user simply inverts the device 10 as shown to provide an inverted V support stand for engaging the digital media device 10. By varying the angle at the hinge 88 formed between the first and second planar portions 84, 86, the user is provided with means for adjusting the viewing angle as desired by the user.

Figure 11:
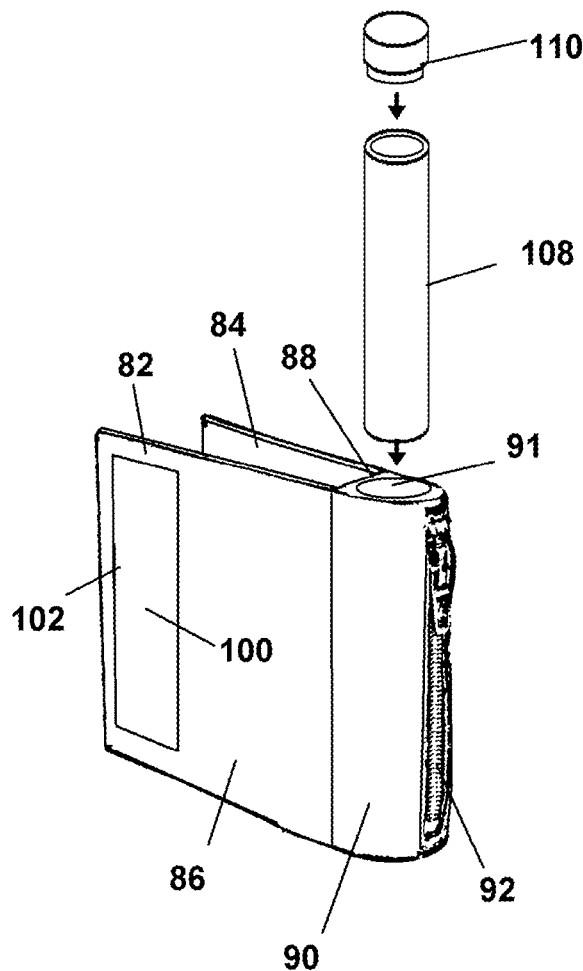
FIG. 11 shows a view of yet another preferred mode of the wallet device wherein a base positioned storage compartment is configured to receive a rigid container.

FIG. 11 shows another particularly preferred mode of the invention wherein the storage compartment 90 includes an access aperture 91 configured to receive a rigid container 108. The container 108 may be in a removable or permanent engagement within the compartment, as deemed suitably by the designer. The rigid container 108 preferably has a removable cap 110, which may employ frictional engagement means, threaded engagement, or other engagement means suitable for the intended purpose. The rigid container 108 will allow the user to store fragile items, such as an insulin needle, test strips which are commonly used by diabetics, however the container 108 can be employed for an items deemed suitable by the user. Further, it should be noted that the shape of the storage compartment 90 itself, its access, or both may be changed to accommodate other contents, and the compartment 90 and/or access thereto may be formed of stretch or elastic material to conform to other contents, or of elastic frictionally engaging material such as neoprene or rubber or surfaced material offering easy ingress for cards but frictional resistance to removal. Further, stacking items such as credit cards, directly on top of each other but adjacent such elastic or stretch material offers a space saving benefit because no material is placed between the cards, thus keeping the size of the wallet smaller.

It should be noted that container 108 need not be in the shape of a cylinder, but that it can also be made in many other shapes as would occur to a designer or one skilled in the art and such are anticipated. Also that it may alternatively be constructed in a manor that allows that inner container to also be flexible, while still offering additional crush resistance. This is accomplished by using a coil type construction for the container 108 which would allow it to be flexible, while still offering additional strength to keep the container from getting crushed. Material could be wrapped around the coil or a type of hose already offering sidewall structural strength could be used. The inner sleeve 111 in this scenario, would still protected items stored inside the compartment and still afford protection from being crushed.

As an alternate way of constructing the storage compartment 90, it can be formed with both fixed and detachable compartments may alternately be made by allowing the two planer modes to be separated with the storage compartments material in between them. This mode may have a zipper or other suitable closure running between the planer storage compartments or access into the storage compartment could be made from inside the wallet.

Figure 12:
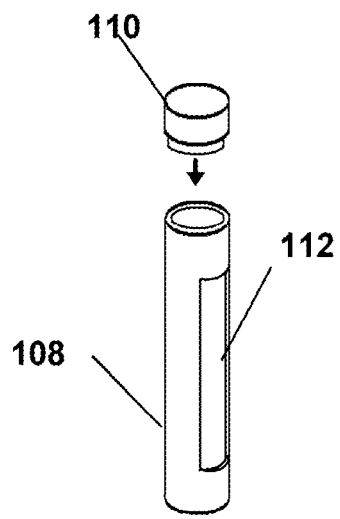
FIG. 12 shows a view of another mode of the rigid container having a cutout portion which aligns with the zipper access.

FIG. 12 shows another mode of the rigid container 108 having a cutout portion 112 configured to align with the zipper access 92. As such, the user is permitted to access the rigid container 108 from the zipper access 92 without removing the entire container 108.

Figure 13:
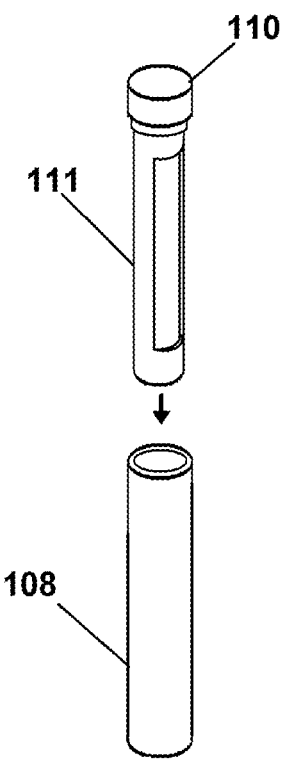
FIG. 13 shows still yet another mode of the rigid container employing an inner sleeve portion formed integrally with the cap, for storing fragile items.

FIG. 13 shows still yet another preferred mode of the rigid container 108 wherein the cap 110 includes an integrated sleeve container portion 111, also for holding fragile items. In this manner, the user does not have to remove the entire container 108 to retrieve their items, but may simply remove the cap 110 with sleeve portion 111 engaged thereto.

Figure 14:
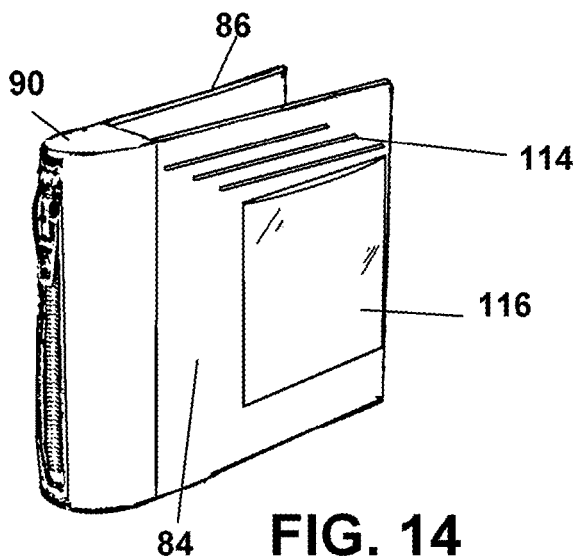
FIG. 14 shows yet another preferred mode of the device employing exterior card holder compartments arranged in a staggered configuration. Also included is a transparent card holder for ID's.

FIG. 14 depicts another preferred mode of the device 10 showing optional exterior card holder compartments 114 arranged in a staggered formation. The staggered arrangement will allow the user to more easily grasp individual cards engaged with the compartments 114. In addition, a transparent ID card holder 116 may also be included for holding ID cards or other items deemed suitable by the user.

Figure 15:
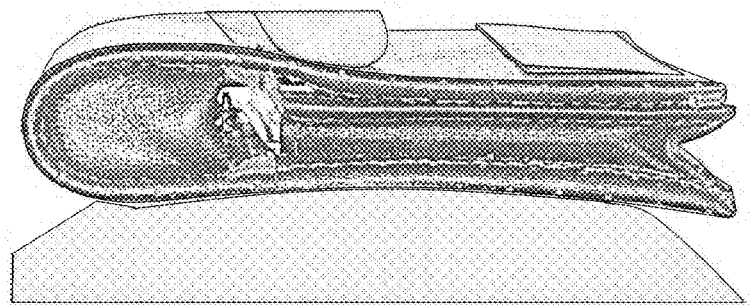
FIG. 15 depicts the wasted space of conventional wallets lacking the conformability of the device herein.
Figure 16:
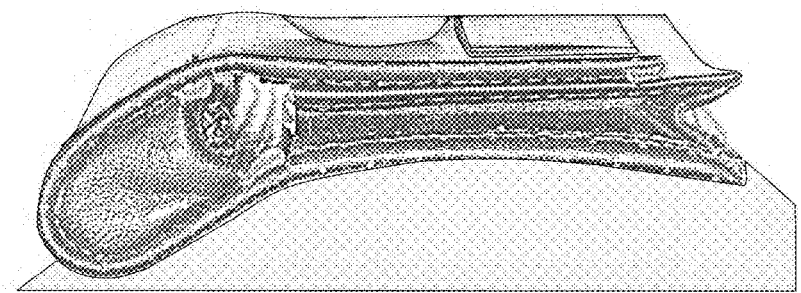
FIG. 16 shows a wallet according to the device herein, following the natural curve of the leg of a user, with wasted space below or above ends of wallet.

In FIG. 15, for example, of the utility of the device herein, there is depicted the wasted space of conventional wallets lacking the conformability of the device herein. However, as shown in FIG. 16, a wallet according to the device herein is able to follow the natural curve of the leg of a user, with no wasted space below or above ends of wallet and maintaining the ability to store an equal amount or more cards. Also, a much more comfortable fit to the user's body is afforded, especially when sitting long periods.

Figure 17:
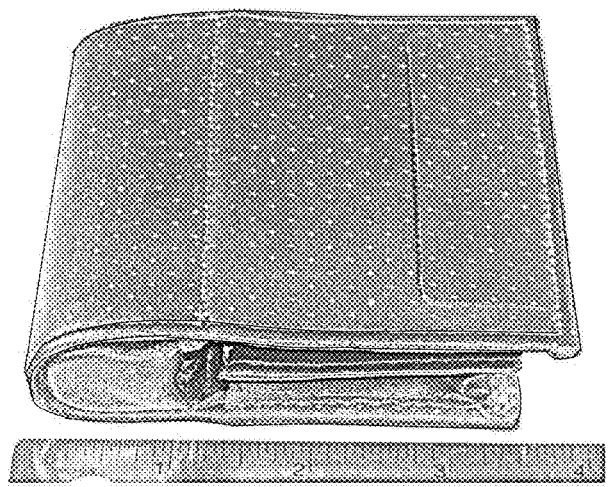
FIG. 17 shows a wallet of the device herein with a lower planer compartment slightly shortened.

FIG. 17 depicts a mode where one compartment is slightly shortened and FIG. 18 depicts a device per the disclosure herein with one planer compartment shortened by approximately inch. This aligns both ends line vertically when in the bent ergonomic bent position such as in FIG. 16. This allows the overall length of the wallet to be shortened mid-point to mid-point, while also looking and feeling comfortable and more natural in the pocket.

In FIG. 19 is depicted a series of views of another preferred mode of the wallet device having a multiple compartment wallet body 120 and engageable support member for a smartphone or the like for angled positioning. As depicted in FIGS. 19a-19c, the body 120 includes on a first side, first compartment 122 adapted for insertion of cash and flexible planar items, and on a second side, a second compartment 124 adapted for credit cards.

Preferably positioned within the first compartment 122 is a planar divider 126 formed of stiff but flexible material such as plastic which will bend with the wallet body 120 but is sufficiently rigid to divide the first compartment 122 so that as in FIG. 19G cash may be separated from paper such as receipts.

Shown in FIG. 19*c* the wallet body 120 has cash in the first compartment 122 and credit cards frictionally engaged in the second compartment 124. This positioning of cash and credit cards is make easier by the formation of sidewalls 128 of both the first compartment 122 and second compartment 124 from stiff but flexible material such as leather bonded to plastic sheeting or treated leather or synthetic material rendering the sidewalls flexible to bend, but sufficiently elastic in nature that the sidewalls 126 return to their planar shape of FIGS. 19*a*-19*c*. This flexure allows for easy insertion and removal of cash and credit cards, and, applies a bias to contents of both pockets to increase a frictional engagement therein.

As shown in FIG. 19, a recess or notch 130 is cut into the sidewalls 128 of both compartments. This as shown in FIG. 19J allows for a compressed engagement between the finger and thumb of the user to insert and remove cash and credit cards from the compartments 122 and 124.

Shown in FIG. 19*k*, the wallet body 120 is flipped vertically with the second compartment 124 Card Compartment on Right. A strap of hook and loop fastener 134 is partially removed from connecting position 136 for hook and loop fastener on a visual media stand 138 engaged with the wallet body 120 which is shown in FIG. 19L with the hook and loop fastener 134 fully engaged.

As depicted in FIG. 19M, the device as in FIG. 19L is placed face down, showing the stand 138 positioned on a rear surface of the wallet body 120. Removal and deployment of the stand 138 is shown starting in FIGS. 19M and 19N wherein the hook and loop fabric 134 is disconnected which holds the stand 138 to the body 120.

Deployment of the stand 138 when removal from the wallet body 120 continues in FIGS. 20A and 20B wherein the stand 138 is fully disconnected from the hook and loop fabric 134 half, and is translated away from the wallet body 120 to disengage a projecting portion 140 from a positioning within a formed pocket in the wallet body 120 such as the second compartment 124 or another formed pocket in the sidewall 128 of the wallet body 120 adapted in size to engage the projecting portion 140.

Shown disconnected in FIG. 20C through 20 E, the stand 138 is shown with opposing folding wings 142 or wing portions, and showing a headrest retainer 144 being held planar by a fastener such as hook and loop fabric. In FIG. 20F the stand 138 is shown detached from main wallet body 120 along with bands 148 encircling the smartphone 146 which are engaged to the a mid-portion of the body forming the stand 138. These bands are preferably elastic such that they will compressibly engage the smartphone 146 but could be hook and loop fabric bands, or bands secured by fasteners also.

Shown in FIGS. 20G to 20I, mating fasteners 150 on both the projecting portion 140 and the headrest retainer 144 are positioned to removably engage to form a base as in 20I which is shown flipped to an as-used positioning in FIGS. 20J through 20O, whereby a triangular support or easel is formed to support the smartphone 146 which is held to the stand by the bands 148 in an inclined angle or vertically disposed to the underlying support surface for the formed support. By adjusting the lateral positioning of the hook and loop fasteners 136 shown in FIGS. 20G and 20H relative to each other, a means to adjust the angle the smartphone 146 is held by the formed stand is available.

In FIG. 21 there is shown a series of other views of the device of FIGS. 20 and 19, in FIGS. 21A through 21L where it is configured between a closed position for pocket engagement and an open position, where the stand 138 remains engaged with the wallet body 120 during such reconfiguration and engagement to the smartphone 146 using bands 148.

In FIGS. 21M through 21O, deployment of the headrest retainer 144 portion is shown in a manner adapted to engage through the space between a vehicle seat and the headrest positioned atop the seat where a gap is therebetween. As can be seen, the headrest retainer 144 can be positioned horizontal and adjacent the body of the stand 138 wherein it will slide through the gap between most vehicle seats and an engaged headrests. Once through this gap, the headrests retainer 144 is rotatable to a position substantially normal or perpendicular to the body of the stand 138 at one end thereof, where the width of the headrest retainer 144 is wider than the gap between headrest and seat. The stand 138 will hang downward from its engagement to the headrest retainer 144 due to the weight of the smartphone 146 or similar computing device with a video display, which is engaged to the stand 138 by bands 148. Finally, as shown in 21J-21L, another means for angle adjustment of the screen of a smartphone 146 or similar device with a video screen, to the user, is provided by the translating into and out of a pocket in the wallet body 120 of the projecting portion 140 of the stand 138.

Finally, in FIG. 22 various perspective views are shown of the stand 138 operatively engaged with the wallet body 120 through positioning of the projecting portion 140 into pocket formed in the sidewalls as noted above, or into the first cavity 122 or second cavity 124.

This invention has other applications, potentially, and one skilled in the art could discover these. The explication of the features of this invention does not limit the claims of this application; other applications developed by those skilled in the art will be included in this invention.

Thus, upon reading this disclosure, those skilled in the art may recognize various other means for carrying and storage of non-flat items and conventional flat items, means for securely yet removably engaging digital media devices, means for holding the digital media device at a plurality of viewing angles, and means for adjusting the viewing angle, which are considerably or slightly different those disclosed, are considered within the scope and intent of the invention herein, and are anticipated withing the scope of this patent.

It is additionally noted and anticipated that although the device is shown in its most simple form, various components and aspects of the device may be differently shaped or slightly modified when forming the invention herein. As such, those skilled in the art will appreciate the descriptions and depictions set forth in this disclosure are merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A wallet comprising:
   a wallet body having a first cavity defined by sidewalls of said body and accessible through a first opening at a first side edge of said body, and a second cavity defined by said sidewalls and accessible through a second opening at an opposing second side edge;
   said wallet body foldable in a center area to position said first side edge adjacent said side edge;
   a stand having a stand body with a projecting portion on a first side engaged within one of said first cavity or said second cavity, in a first engagement with said wallet body;
   said stand having a retainer portion at a second end of said retainer body;
   said retainer portion sized for a sliding engagement into the other of said first cavity or said second cavity from said projecting portion in said first engagement;
   a mid section of said stand body having bands thereon adapted to encircle a planar computing device to an as-used attachment with said retainer body;
   said mid portion of said stand body vertically disposed in an inclined angle relative to a support surface for said wallet body with said projecting portion in said first engagement and said retainer portion in said second engagement; and
   whereby with said wallet positioned on said support surface provides a support for maintaining said planar computing device in said as-used attachment in said inclined angle.

2. The wallet of claim 1 wherein said angle of said inclined position is adjustable by sliding a portion of said retainer portion a distance out of said first cavity or second cavity hosting said second engagement.

3. The wallet of claim 1 wherein said first engagement of said projecting portion is a sliding engagement into one of said first cavity or said second cavity and said angle of said inclined position is adjustable by sliding a portion of said projecting portion a distance out of said first cavity or second cavity hosting said first engagement.

4. The wallet of claim 3 additionally comprising:
   said stand removable from said wallet body by disengaging said projecting portion from said first engagement;
   said projecting portion removably engageable with said retainer portion to form a triangular shape to said stand; and
   whereby said stand, separated from said wallet body, provides said support to maintain a said planar computing device engaged with said mid section thereof in said as-used attachment, in said inclined angle.

5. The wallet of claim 1 wherein said flexible sidewalls include flexibly rigid material which during compression by a user at first and second ends of said sidewalls, at a position adjacent either of said first opening or said second opening, said compression causes an enlargement of a width of said respective first or second opening adjacent said position.

6. The wallet of claim 5 wherein said flexible sidewalls include flexibly rigid material which during compression by a user at first and second ends of said sidewalls, at a position adjacent either of said first opening or said second opening, said compression causes an enlargement of a width of said respective first or second opening adjacent said position.

7. The wallet of claim 5 wherein a flexibly rigid divider is positioned within one of said first cavity or said second cavity, said divider flexing toward one of said sidewalls during said compression.

8. The wallet of claim 6 wherein a flexibly rigid divider is positioned within one of said first cavity or said second cavity, said divider flexing toward one of said sidewalls during said compression.

* * * * *